Oct. 17, 1933.    F. A. HAMILTON    1,930,802
JACKING OF MOTOR AND OTHER VEHICLES
Filed April 28, 1932    4 Sheets-Sheet 1

Francis Alexander Hamilton
Inventor
By John J. Thompson
Attorney

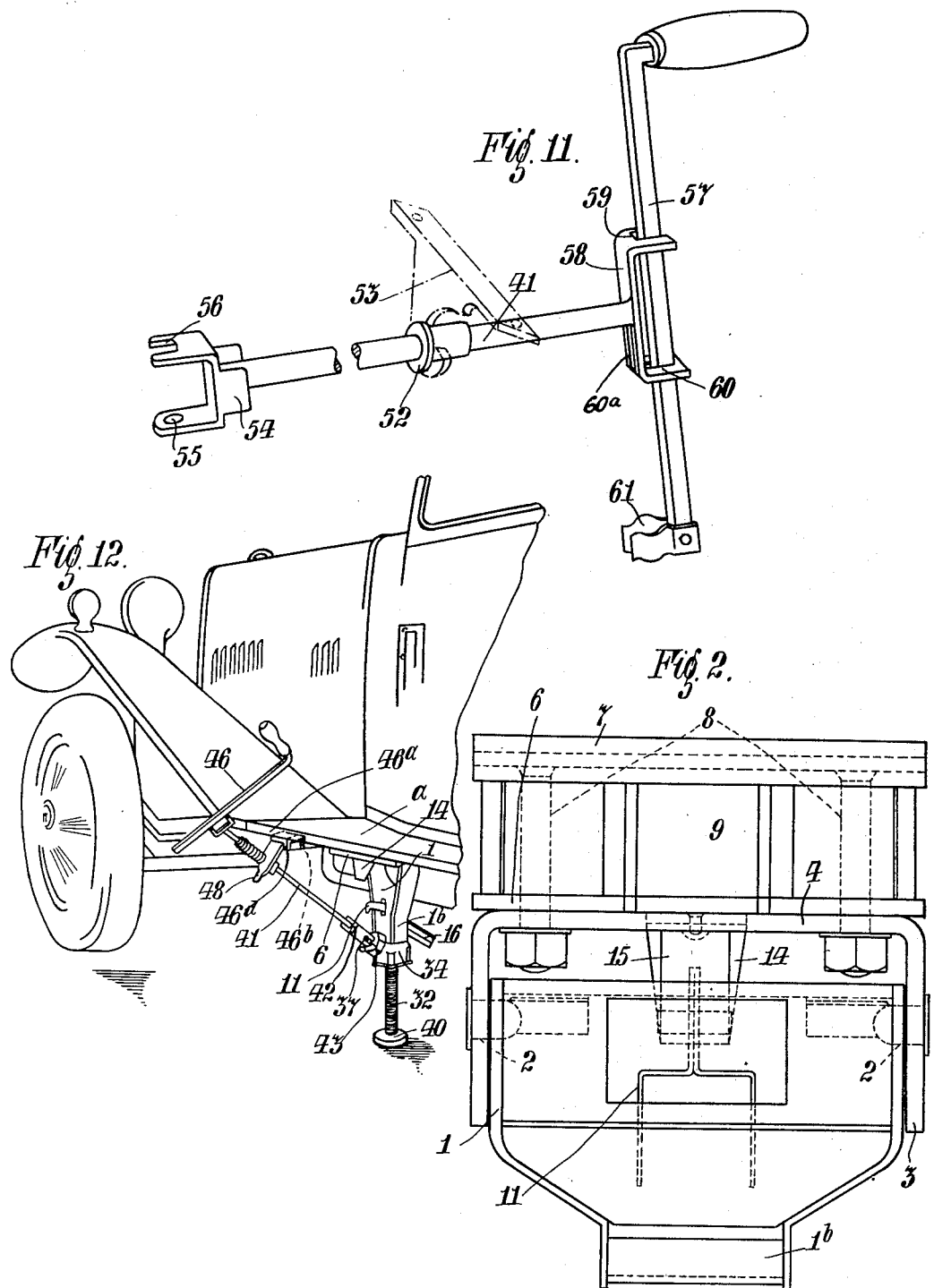

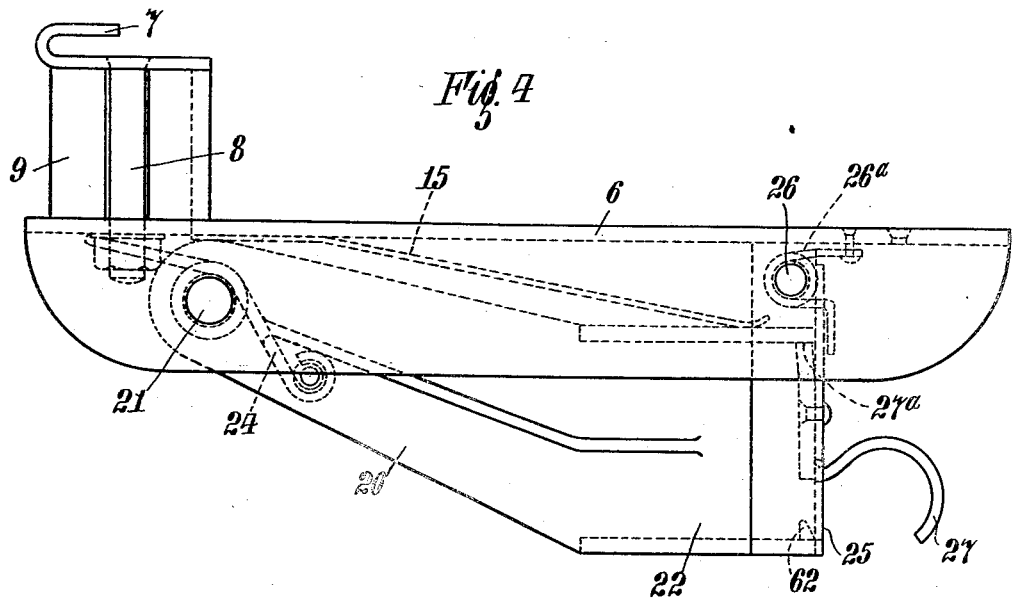
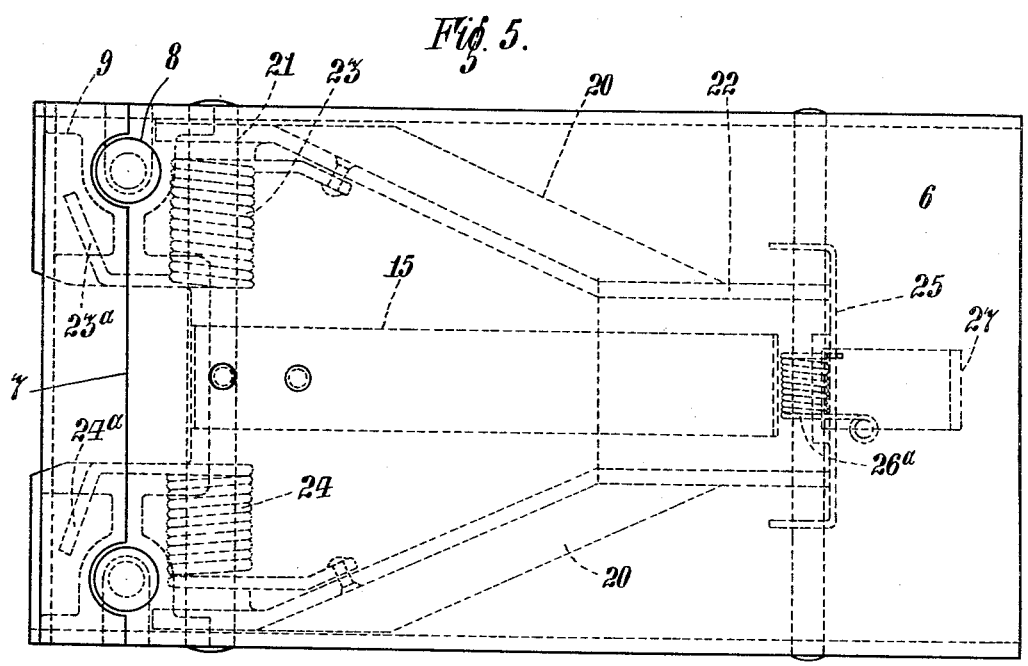

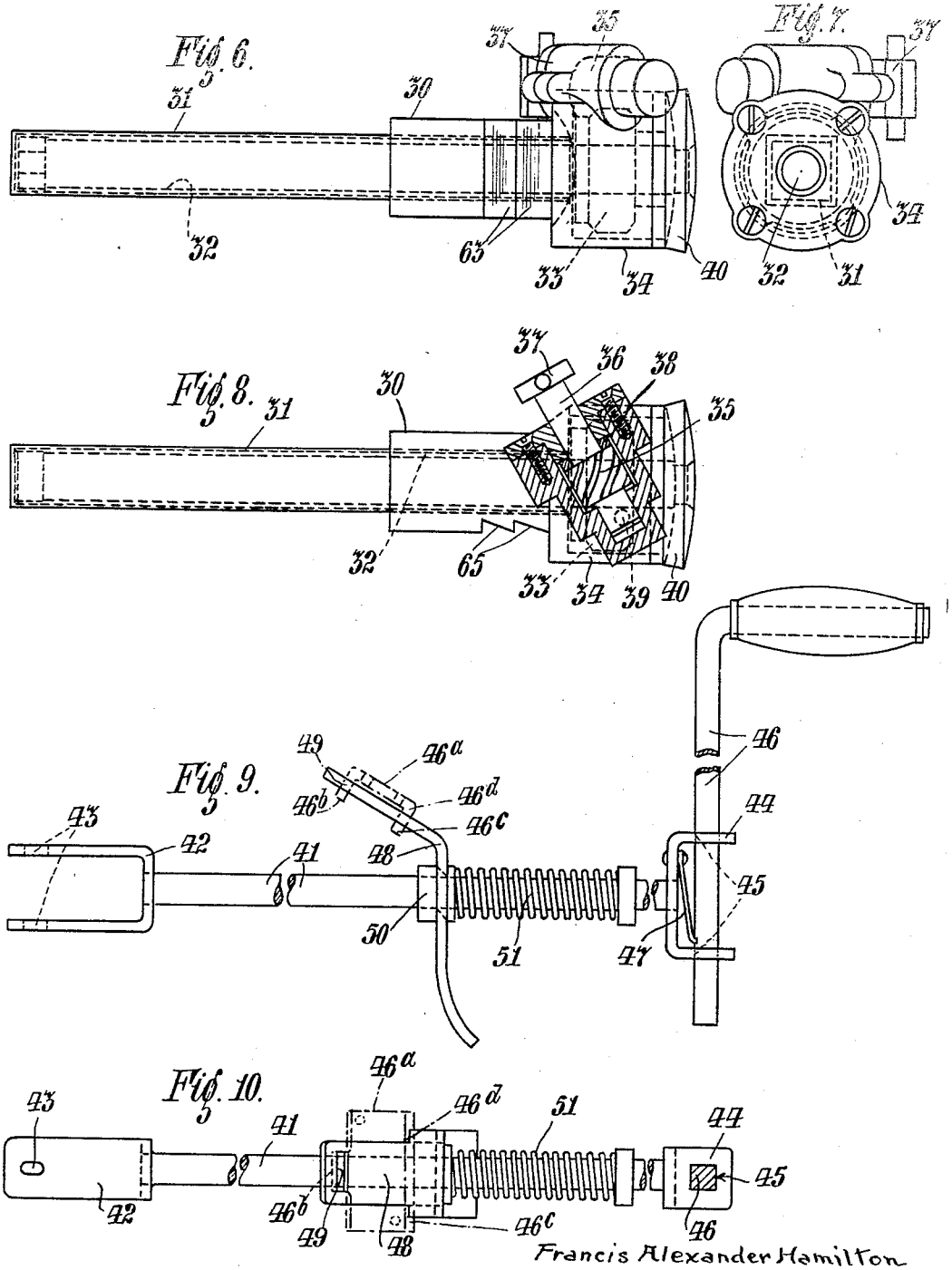

Patented Oct. 17, 1933

1,930,802

UNITED STATES PATENT OFFICE 1,930,802

JACKING OF MOTOR AND OTHER VEHICLES

Francis Alexander Hamilton, Whitehouse, Northern Ireland

Application April 28, 1932, Serial No. 607,960, and in Great Britain August 20, 1931

7 Claims. (Cl. 254—133)

This invention relates to the jacking up of motor and other vehicles.

In jacks of the type fitted one on each side of the chassis it has hitherto been found difficult to obtain the necessary fore and aft stability which is required in jacks of this type, but under the present invention it is possible to provide for greater fore and aft stability than is possible with jacks of this type at present in use.

According to the present invention, I provide a simple attachment device which can either be permanently attached to the vehicle or otherwise applied to the vehicle, as and where required, and with which any suitable form of jack can be removably or permanently attached, said attachment or device being characterized by an arm attached at one end to the chassis or other part of the vehicle through a suitable member or members, in such manner that the points of contact with the chassis or other part of the vehicle or a bracket or brackets attached thereto are at such distance apart as to give the necessary rigidity to the jack, the other end of the said arm being adapted to receive a member, or members, capable of being extended by any suitable means and which extending member or members may be permanently attached or removable in whole or in part.

The arm of the device may be V-shaped or Y-shaped and be hingeable or otherwise connected at its upper end to the chassis of the vehicle and carry or receive the lifting jack at its lower end.

Spring or elastic means may also be provided whereby the arm of the device is normally constrained into the out-of-use position. Spring or other locking means may likewise be provided for holding the arm in its out-of-use position.

The invention will now be described, by way of example, with reference to the annexed drawings, in which:—

Fig. 2 is an end elevation corresponding to Fig. 1, looking in the direction of the arrows $x$;

Fig. 4 is a side elevation of another form of attachment device with the arm in the out-of-use position;

Fig. 5 is a plan view corresponding to Fig. 4;

Fig. 6 is an outside elevation of a jack for use with the device shown in Figs. 1 to 3, and Figs. 4 and 5;

Fig. 7 is an end view of the jack shown in Fig. 6;

Fig. 8 is another view of the jack partly sectioned to show the worm gear;

Fig. 9 is a side elevation of an operating handle (partly broken away) for the jack shown in Figs. 6 to 8;

Fig. 10 is a plan view corresponding to Fig. 9;

Fig. 11 is a perspective view of a modified form of handle, also partly broken away;

Fig. 12 is a perspective view showing the device (Figs. 1 to 3), jack, and operating handle (Figs. 9 and 10), in use on a vehicle.

Figure 1:
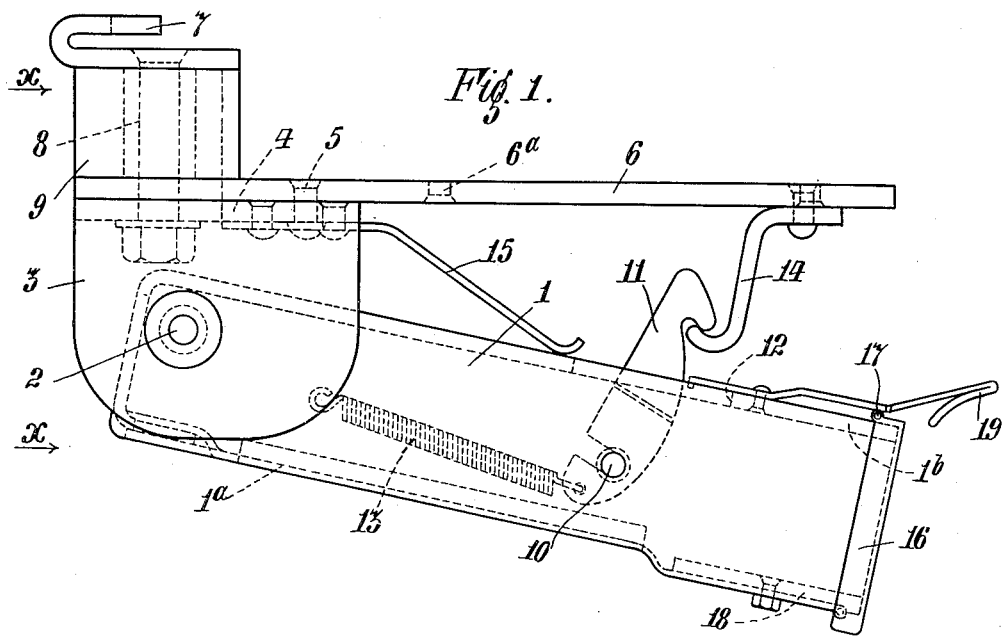
Fig. 1 is a side elevation of one form of attachment device with the arm in the out-of-use position.
Figure 3:
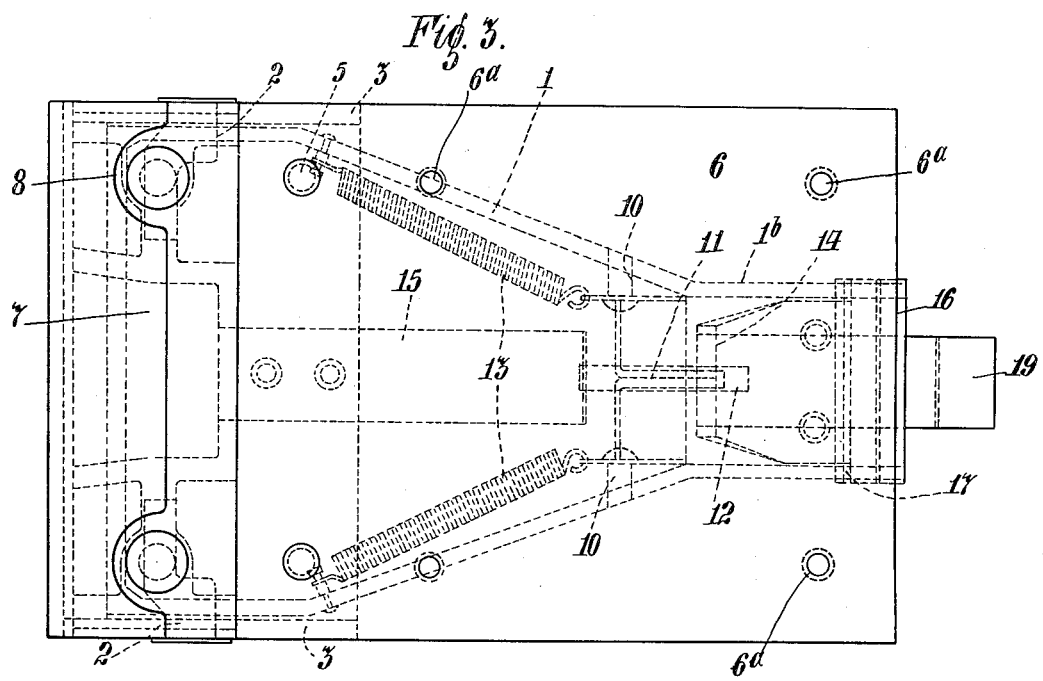
Fig. 3 is a plan view corresponding to Fig. 1.

Referring to Figs. 1 to 3 of the drawings:—

The device shown in these figures comprises a substantially triangular or Y-shaped arm 1 which is hinged on pivots 2 arranged in the depending cheeks 3 of a U-shaped member 4. This member is secured by rivets 5 to the rear end of a rectangular plate 6, which is provided with countersunk holes $6^a$ so that it may be secured to the under side of the running board (not shown) of the vehicle.

A U-shaped metal clip 7, extending across the whole width of the plate 6, is secured to the rear end of this plate by means of bolts 8 and distance piece 9, this metal clip being adapted to engage with, and grip, the bottom flange of the side member of the chassis (not shown).

The triangular or Y-shaped arm 1 is substantially of box shape in transverse section, a cover plate $1^a$ closing an opening on the lower side. Towards the forward end of the arm 1, two pivot pins 10 (see Fig. 3) are provided so as to carry a hook 11. The hook 11 is so made that whilst it is forked at its lower end, the forked parts are brought together about midway up the hook (see Fig. 2) and project through a relatively narrow slot 12 in the top wall of the arm 1. To each lower part of the hook 11, a tension spring 13 is attached, so that the upper end of the hook 11 is under constant constraint outwardly of the vehicle and is thereby adapted to engage with a locking catch 14 secured on the under side of the plate 6.

Beneath the rear portion of the plate 6, a flat spring 15 is secured so as to exert downward pressure on the triangular or Y-shaped arm 1 when in its upper or out of use position. In this manner, rattling of the triangular or Y-shaped arm 1 is prevented, whilst, at the same time, the spring gives added security against disengagement of the hook 11 and catch 14.

At the outer or lower end of the triangular or Y-shaped arm 1 a square socket 1b is formed, into which a jack hereinafter described with reference to Figs. 6 to 8 is adapted to be inserted. The mouth of this socket is normally closed by a cap 16 mounted on a pivot 17. This cap is held against the mouth of the socket 1b by a spring bolt 18, and, when fully opened, is adapted to be held backwards out of the way of the said socket by a spring catch 19.

Referring to Figs. 4 and 5:—

The device shown in these figures is similar in design to that shown in Figs. 1 to 3, but is simplified in constructional details. A V or Y-shaped arm 20 is hinged to a rectangular plate 6 by a single pivot pin 21, this arm having simply two divergent portions of T-section united to a boss 22. A cap 25 is adapted to hold the arm 20 in the position shown in Fig. 4, and as will be seen, the said cap is pivoted on a pin 26 and engages with and closes the mouth of the boss 22 by a torque spring 26a, and is provided with a handle 27 of which the inner end 27a is adapted to engage below the upper inner edge of the boss 22, thereby retaining the arm 20 in its out-of-use position as stated.

Torque springs 23 and 24 are attached or connected with the arm 20 in such manner that when the cap 25 is pulled back releasing the arm from its constrained out-of-use position (in which position it is held by the cap 25) the arm when it falls a certain predetermined distance causes the ends 23a and 24a of the springs 23 and 24 to bear on the plate 6, thereby holding the arm 24 in a downwardly inclined position so that the jack can conveniently and easily be introduced into the bracket 20 as previously described. The jack, having been inserted into the bracket, is then forced down into operative position against the action of the springs 23 and 24 which have a tendency to pull the jack casing upward so that when the sleeve 52 (see Fig. 11 referred to hereinafter) is engaged with the slot in the bracket 53 (see, also, Fig. 11) the action of the springs 23 and 24 will be to hold the collar of the sleeve 52 firmly against the bearing bracket 53 (Fig. 11).

As will be apparent from a comparison of Figs. 4 and 5 with Figs. 1 to 3, the U-shaped clip 7 provided for attachment of the plate 6 to the chassis side member of the vehicle is similar to that described with reference to the first described construction.

Referring to Figs. 6 to 8:—

These figures show a loose jack of which the squared boss 30 is adapted to fit into either the socket 1b of the arm 1 shown in Fig. 1 or the socket 22 of the arm 20 shown in Fig. 4. Within an elongated casing 31 mounted in the boss 30, the screw 32 of the jack is housed. This screw is in threaded engagement with a combined worm-wheel-and-nut 33 which is held against axial movement in a housing 34 and is adapted to be rotated by a worm 35. For rotation of the worm 35, the spindle 36 having a coupling head 37 is provided. The worm 35 is also provided with a thrust ring 38 and a steel ball bearing 39, whilst a disc-shaped foot 40 is secured on the extensible end of the screw 32.

Referring to Figs. 9 to 11:—

In Figs. 9 and 10, one form of handle for operating the jack shown in Figs. 6 to 8 is illustrated. The stem 41 of the handle is provided at one end with a fork 42, in each limb of which a slot 43 is provided so that engagement may be made with the outwardly projecting pins of the coupling head 37 of the stem of the worm 35. At the opposite end of the stem 41, a U-shaped member 44 is fixed, through the holes 45 of which a square section handle 46 is insertible. The crank 46 is held in whatever position it is adjusted relatively to the U-shaped member 44 by a leaf-spring 47. About midway along the stem 41, an obtuse-angled bracket 48 having a transverse slot 49 (Fig. 10) is arranged. This bracket is pressed against a fixed collar 50 by a spring 51 and serves for the temporary attachment of the operating handle to a bracket 46a (see chain dotted lines, Figs. 9 and 10). This bracket 46a has a depending lug 46b, and a depending flange 46c provided with a horizontal slot 46d, and, as hereinafter described with reference to Fig. 12, is attachable to the under-side of the running board of the vehicle.

The operating handle shown in Fig. 11 is a simpler construction than that described above in that the stem 41 is simply provided with a collared sleeve 52 adapted to engage with a bearing bracket 53 (see chain dotted lines, Fig. 11) attachable to the under-side of the running board. One face of the bracket 53 makes contact with the face of the collared sleeve 52 remote from the end of the handle stem 41 carrying the fork 54. One of the limbs of this fork 54 is provided with a circular or oval hole 55, whilst the other has a longitudinal slot 56. In practice, the stem 41 is manipulated so that the hole 55 engages with one of the transverse pins of the coupling head 37 of the worm 35, whereupon the other pin of the coupling head is engaged by the slot 56. For rotating the stem 41, a crank 57 of square section is carried by a U-shaped member 58 having an open-ended slot 59 and a closed slot or hole 60 provided with an extension 60a, so arranged that, when the crank is not in use, it may be disposed parallel with the stem 41, and held in such position by engagement of a spring clip 61 with the said stem.

Referring to Fig. 12:—

This figure shows the manner in which the attachment device, jack and operating handle are adapted to be assembled for use on a vehicle. The attachment device illustrated in this figure is that shown in detail in Figs. 1 to 3, and is permanently fixed to the corresponding side member of the vehicle chassis so that the plate 6 extends forwardly beneath and is secured to the running board a. When required for use, the cover cap 16 of the V or Y-shaped arm 1 is opened, and the elongated casing 31 (Fig. 6) inserted into the mouth of the squared socket 1b (Fig. 1). Thereupon the hook 11 is disengaged from the locking catch 14 (Fig. 6), this being due to the forked construction of the hook 11, with which fork the squared boss 30 engages on being pushed home in the socket 1b (Fig. 1). The arm 1 and jack are then turned downwards into a vertical position. In order that the jack may not drop out from the arm 1 during this operation, a small retaining ledge or ledges may be provided in the socket of the arm, see, for example, the ledge or projection 62 (Fig. 4) provided at the mouth of the socket or boss 22 of the arm 20 shown in Figs. 4 and 5. This ledge 62 is adapted to engage with a projecting tooth or teeth 63 on the boss 30 of the jack (see Fig. 8).

The attachment of the operating handle (Figs. 9 and 10) to the coupling head 37 of the worm 35 of the jack (Fig. 8) is next carried out, the stem 41 being manipulated so as to engage first one slot 43 of the fork 42 and then the other slot. Thereafter, the operating handle is attached to the running board $a$ by means of the bracket 46ª, into the slot 46ᵈ of which the apertured part of the bracket 48 (see Figs. 9 and 10) is adapted to be inserted so that the slot 49 (Fig. 10) of the bracket 48 engages with the rear depending lug 46ᵇ of the bracket 46ª. When the handle has been thus arranged on the vehicle, the crank 46 is rotated so as to cause the worm 35 and the combined worm-wheel-and-nut 33 to extend the screw 32 downwards. Thereupon, in known manner, on contact of the foot 40 with the ground, further operation of the crank 46 results in the corresponding side of the vehicle being raised.

In practice, the attachment device, according to the present invention, is preferably so disposed on the chassis side member that the operation of the jack, as described, results in the whole side of the vehicle being raised, thereby lifting both wheels at that side off the ground simultaneously.

The lowering of the vehicle by means of the described jack is carried out simply by a reversal of the operations above described, whereafter the operating handle is removed from the running board. This is followed by the removal of the operating handle from the jack, which, in turn, is removed from the V or Y-shaped arm 1 (by the disengagement, in the case of an arm 20 as shown in Figs. 4 and 5, of the projecting teeth 63 from the retaining ledge 62). Finally, the V or Y-shaped arm is swung upwards into its normal horizontal position, wherein it is held by the engagement of the hook 11 with the locking catch 14, and the operations are concluded by closure of the cover cap 16.

I claim:—

1. For use with a jack for a vehicle, an attachment device comprising an upwardly widening arm having a central lower socket wherein the jack is insertible, and means whereby said arm is connected at its wide upper end with said vehicle so as to be movable into or out of an operative position wherein said vehicle is supported by said jack at points spaced apart from the axis of said central socket so as to give stable support to the vehicle when raised by said jack.

2. For use with a jack for a vehicle, a Y-shaped arm adapted to receive said jack at its narrow end, and means whereby said arm is connected at its wide end to said vehicle so that said vehicle when raised and said jack when extended are stabilized to each other.

3. Jacking apparatus for a vehicle comprising an extensible jack, means for operating said jack, a divergent arm having a socket to receive said jack so that the greater part of the length of said jack when retracted projects within said arm, and means whereby said arm is attached at its divergent end to said vehicle so that said vehicle is supported by said jack at points spaced fore and aft from the axis of said socket so as to give stable support to said vehicle when raised by said jack.

4. For use with a jack for a vehicle, an attachment device comprising a Y-shaped arm adapted to receive said jack, means whereby said arm is hingeably connected to said vehicle at points spaced apart fore and aft, and spring means acting below said arm to hold it by upward thrust in inclined position to facilitate insertion therein of said jack.

5. Jacking apparatus for a vehicle comprising an extensible jack, a jack-receiving arm, means for attaching said jack-receiving arm to said vehicle, means whereby said jack-receiving arm is adapted to stabilize the vehicle when raised by said jack, spring locking means for holding said jack-receiving arm in an out-of-use position, spring means whereby said jack-receiving arm when released from said locking means is held in a downwardly inclined position, and means for operating said jack and adapted also to hold said arm and jack vertical against the action of said spring means.

6. The combination with a jack for a vehicle of an attachment device comprising a jack-receiving arm, means connecting said jack-receiving arm to a side of said vehicle at points spaced apart lengthwise of said vehicle so that said jack can be applied to the jack-receiving arm so as to lift the two wheels at the said side of the vehicle and maintain the stability of the vehicle and jack in this position.

7. For use with a loose jack for motor vehicles, a Y-shaped arm having a socket at its lower narrow end to receive said jack, and a pair of separate coaxial pivots whereby said arm at its wide upper end is permanently connected to said vehicle at points symmetrically disposed apart with respect to the axis of said socket so as to stabilize said vehicle fore and aft when raised by said jack.

FRANCIS ALEXANDER HAMILTON.